US009609072B2

(12) United States Patent
Louis et al.

(10) Patent No.: US 9,609,072 B2
(45) Date of Patent: Mar. 28, 2017

(54) SOCIAL DATING

(71) Applicant: Facebook, Inc., Menlo Park, CA (US)

(72) Inventors: Jennifer Jordan Louis, San Francisco, CA (US); Paul Adams, Dublin (IE)

(73) Assignee: Facebook, Inc., Menlo Park, CA (US)

( * ) Notice: Subject to any disclaimer, the term of this patent is extended or adjusted under 35 U.S.C. 154(b) by 374 days.

(21) Appl. No.: 13/797,834

(22) Filed: Mar. 12, 2013

(65) Prior Publication Data
US 2014/0279066 A1 Sep. 18, 2014

(51) Int. Cl.
*G06F 17/30* (2006.01)
*G06Q 10/10* (2012.01)
*H04L 29/08* (2006.01)

(52) U.S. Cl.
CPC ........ *H04L 67/22* (2013.01); *G06F 17/30864* (2013.01); *G06Q 10/10* (2013.01); *H04L 67/18* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 7,636,779 B2 | 12/2009 | Hayashi et al. | |
| 8,005,906 B2 | 8/2011 | Hayashi et al. | |
| 8,595,167 B1 * | 11/2013 | Grieve | 706/45 |
| 2007/0150603 A1 | 6/2007 | Crull et al. | |
| 2007/0162569 A1 | 7/2007 | Robinson et al. | |
| 2007/0169165 A1 | 7/2007 | Crull et al. | |
| 2007/0255831 A1 | 11/2007 | Hayashi et al. | |
| 2008/0086319 A1 | 4/2008 | Berger | |
| 2008/0208973 A1 | 8/2008 | Hayashi et al. | |
| 2009/0164464 A1 * | 6/2009 | Carrico et al. | 707/5 |
| 2009/0271409 A1 * | 10/2009 | Ghosh | G06Q 10/10 |
| 2010/0223066 A1 | 9/2010 | Berger | |
| 2010/0293476 A1 | 11/2010 | Rosenblum et al. | |
| 2011/0289011 A1 * | 11/2011 | Hull | G06Q 10/107 705/319 |
| 2011/0289142 A1 * | 11/2011 | Whalin et al. | 709/203 |
| 2012/0290659 A1 | 11/2012 | Rao et al. | |
| 2012/0290978 A1 * | 11/2012 | Devecka | 715/810 |
| 2012/0323810 A1 | 12/2012 | Nicolazzo | |
| 2013/0007149 A1 | 1/2013 | Harris | |
| 2014/0258260 A1 * | 9/2014 | Rayborn | 707/707 |

* cited by examiner

*Primary Examiner* — Rehana Perveen
*Assistant Examiner* — Raheem Hoffler
(74) *Attorney, Agent, or Firm* — Perkins Coie LLP

(57) ABSTRACT

Systems and methods for social dating are provided. In particular, some embodiments provide recommendations for connections (i.e., candidate users) based on a user's social graph. These recommendations can identify potential single individuals that may be good matches for dating or can identify individuals with other commonalities or shared experiences to create dialog. For example, the recommendations for a user can include single individuals that are friends of a friend. The user can be presented with information about the recommendation and then ask for an introduction from the user's friend. As another example, the recommendations can be based on subject matter selected by the user (e.g., twins, cancer, phone type, etc.) with or without any friendship connections. The user may also be able to filter or further refine the searches based on other criteria such as interests, location, age, and/or other constraints. Rewards can be provided in some cases to encourage participation.

19 Claims, 8 Drawing Sheets

SOCIAL DATING

TECHNICAL FIELD

Various embodiments of the present invention generally relate to connecting people via a social graph. More specifically, various embodiments of the present invention relate systems and methods for creating connections for social dating and/or based on interest areas.

BACKGROUND

Users of social networking services may form connections, associations, or other relationships with other users based on real-life interactions, online interactions, or a wide variety of other bases. For example, users may choose to connect with others who are in the same geographic location, who have a common circle of friends, who have attended the same college or university, etc. Existing social networking systems provide limited mechanisms for finding such connections.

In some instances, for example, social networking systems provide individuals with access to an introduction mechanism. The introduction mechanism may be as simple as showing the profiles of matched individuals through listings, social network visualizations, or through context-aware match alerts and introduction management tools that aim to encourage interpersonal contact. Without doing a specific search for a user, it is a common challenge for users to locate other users with whom they may wish to form a connection. Identifying users for specific types of connections is almost impossible. As such, needs exist for improved techniques for identifying and connecting users.

SUMMARY

Systems and methods are described for identifying and connecting users of a third-party service through a social networking system. Some embodiments provide for a method that includes receiving a request from a first member of a social network to identify candidate users. The candidate users may include at least one candidate user associated with the third-party service. Using a social graph from the social network, a set of candidate users can be identified that match a preference set (e.g., a relationship status of single or unknown, location, a medical experience, a life experience, etc.) and include the at least one candidate user. Then, a graphical user interface can be populated with profile information regarding the set of candidate users.

The first member can then request, through the graphical user interface, an introduction with a specific candidate user. In some embodiments, one or more connector members from the social network suitable for introducing the first member to the specific candidate user can also be presented along with the candidate users. The first member can then submit a connection request through the graphical user interface to connect the first member to the specific candidate user via a specific connector member (e.g., a common friend to the specific candidate user and the first member). Communications between the first member and the specific candidate via the specific connector member can also be facilitated.

Embodiments of the present invention also include computer-readable storage media containing sets of instructions to cause one or more processors to perform the methods, variations of the methods, and other operations described herein.

Various embodiments also include a system having a database, application programming interface server, an identification module, a graphical user interface (GUI) generation module, a permissions module, an advertisement module, a filtering module, and/or a rewards module. The database may have a plurality of data about members, objects, and connections within a social network. This information can be used to form a social graph describing the interconnections of the members. The API server can receive information (e.g., third-party profiles) that identifies a subset of the members that are associated with the third-party service.

The identification module can be used to generate a set of candidate users for a first member of the social network. The set of candidate users can include members that match a preference set and are members of the social network and/or the third-party service. The identification module can access the database and use the data about the members, objects, and connections to rank the candidate users.

The GUI generation module can generate one or more graphical user interface screens to present profile information regarding each candidate user. In addition, one or more connector members suitable for introducing a specific candidate user and the first member may also be presented within the GUI. The first member can then utilize the GUI to communicate with the first member and the connector member to request an introduction or find out additional information.

The permissions module can identify permissions set by each member regarding information about the set of candidate users that can be transmitted to the third-party applications. The advertisement module can generate advertisements requesting the members of the social network allow the social network to share member information with the third-party applications. The filtering module can reduce the set of candidate users based on one or more filter criteria (e.g., location, relationship status, medical experience, or life experience). The rewards module can determine one or more rewards based on participation of the first member with the third-party applications.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
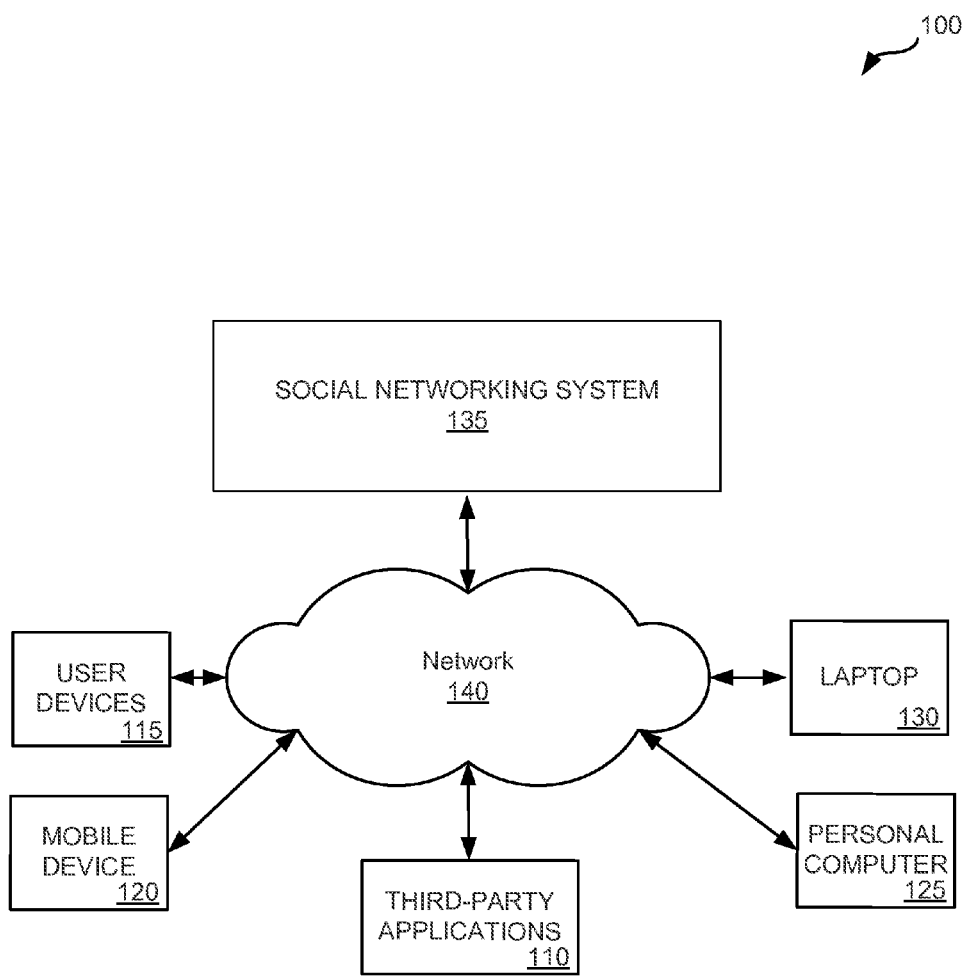
FIG. 1 illustrates an example of a networked-based environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to connecting people via a social graph. More specifically, various embodiments of the present invention relate systems and methods for creating connections for social dating and/or based on identified interest areas specified by a user. Traditional social networking systems allow users to form connections, associations, or other relationships with other users based on real-life interactions, online interactions, or a wide variety of other bases. Unfortunately, these traditional systems do not easily identify potential candidate users for making romantic connections or based on specific interest areas specified by the user.

In contrast, various embodiments of the present invention provide techniques for identifying candidate users that match a preference set of desired traits, interests, or experiences (e.g., medical conditions such as breast cancer). In some embodiments, the candidate users can be identified based on public and/or private information on their profile (e.g., relationship status). The information accessed for identifying the candidate users may be subject to privacy restrictions set by the user or social network. Once the candidate users have been identified, additional mechanisms can be used to facilitate introductions. For example, to facilitate introductions between members in some embodiments, connector members (e.g., members of the social network that are connected through a social graph) can be used.

In some embodiments, an application (e.g., a third-party application) may connect with, share information with, or access the social network. Members of the social network can agree to participate with the third-party application or service. Using a social graph of the social network, candidate users that have agreed to participate in the third-party service can be identified. For example, if the third-party service is a dating application, the information retrieved could identify candidate users that have a relationship status of single and are interested in the gender of the user. In at least one embodiment, the candidate users may be friends of friends of the candidate. Common friends or other types of connector users may be identified. The user can send inquiries to the common friend or connector user about a specific candidate user that is of interest. The application may also allow the user to filter the results (e.g., based on location, age, etc.) and identify the candidate users to save for later review.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary channels or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

General Description

FIG. 1 illustrates an example of a networked-based environment 100 in which some embodiments of the present invention may be utilized. As illustrated in FIG. 1, various applications 110, user devices 115, mobile devices 120, personal computers 125, laptops 130, and/or other devices can be used to access social networking system 135. These devices and tools may use network 140 to submit and retrieve information from social networking system 135. User device 115 can be any computing device capable of receiving user input as well as transmitting and/or receiving data via the network 140. In one embodiment, user device 115 can be a conventional computer system, such as a desktop 125 or laptop computer 130. In another embodiment, user device 115 may be mobile device 120 having computer functionality, such as a personal digital assistant (PDA), mobile telephone, smart-phone or similar device. In one embodiment, user device 115 executes an application allowing a user of user device 115 to interact with the social networking system 135. For example, user device 115 can execute a browser application to enable interaction between the user device 115 and social networking system 135 via the network 140. In another embodiment, user device 115 interacts with social networking system 135 through an application programming interface (API) that runs on the native operating system of the user device 208, such as IOS® or ANDROID™.

User devices 115 can be configured to communicate via the network 140, which may comprise any combination of local area and/or wide area networks, using both wired and wireless communication systems. In one embodiment, network 140 uses standard communications technologies and/or protocols. Thus, network 140 may include links using technologies such as Ethernet, 802.11, worldwide interoperability for microwave access (WiMAX), 3G, 4G, CDMA, digital subscriber line (DSL), etc. Similarly, the networking protocols used on network 140 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 145 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Figure 2:
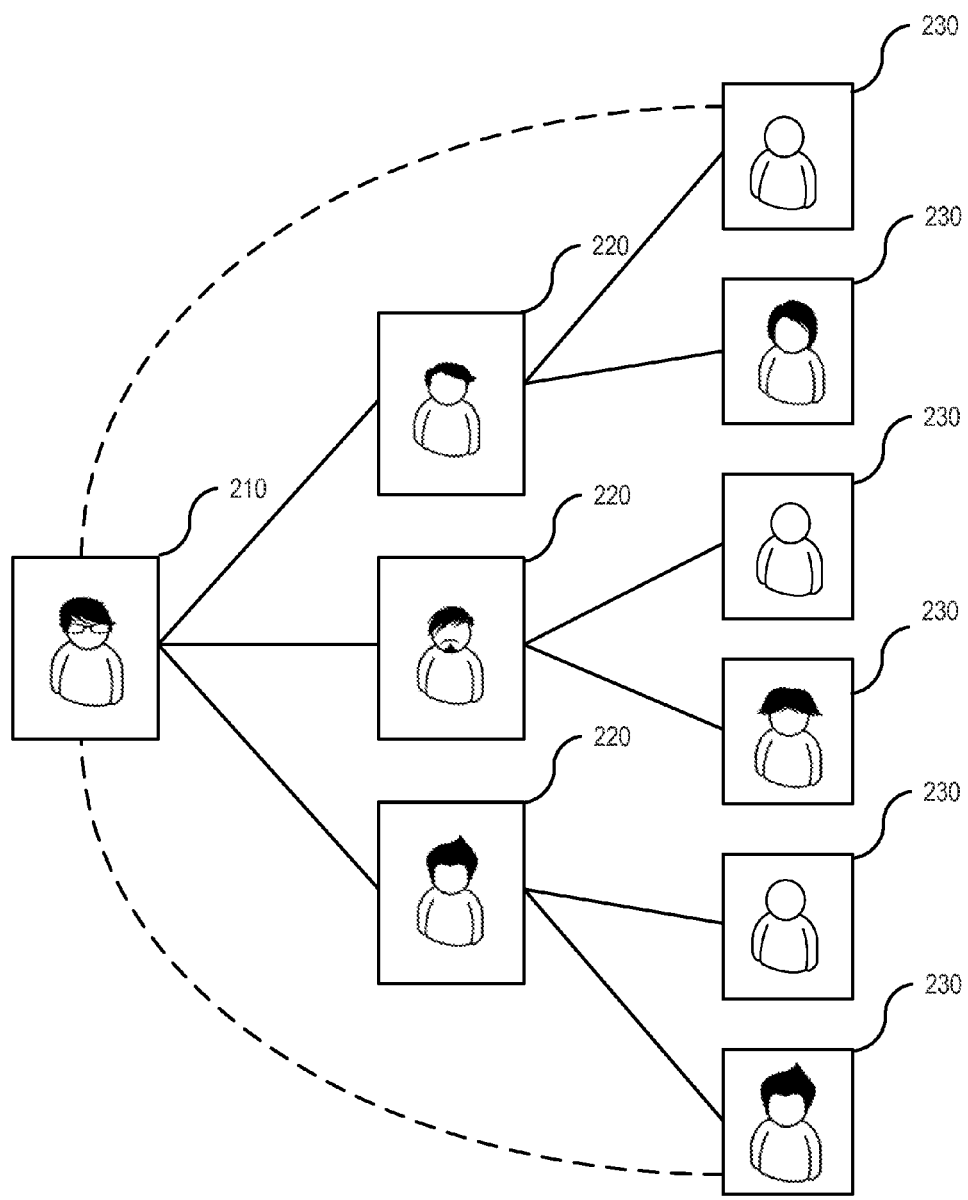
FIG. 2 is a diagram illustrating how connections between users of a social network can be utilized to identify candidate users in accordance with various embodiments of the present invention.

FIG. 2 is a diagram illustrating how connections between users of social networking system 135 can be utilized to identify candidate users in accordance with various embodiments of the present invention. User 210, using user device 115, for example, can submit a request to identify a set of candidate users. The candidate users may be both members of the social networking system 135 and/or a third-party service (e.g., a dating service). The request can properly identify the user 210 (e.g., by providing authentication credentials) to the social networking system 135 and indicate a specified set of criteria to be met in order for a member to be identified as a candidate user. In addition to identifying candidate users, the system may identify connector members 220 (e.g., friends of the user 210 as identified by a social graph) to aid in facilitating introductions and/or finding out additional information about specific candidate users 230 which are connected to the connector member 220 (e.g., friends of friends of the user 210).

Figure 6:
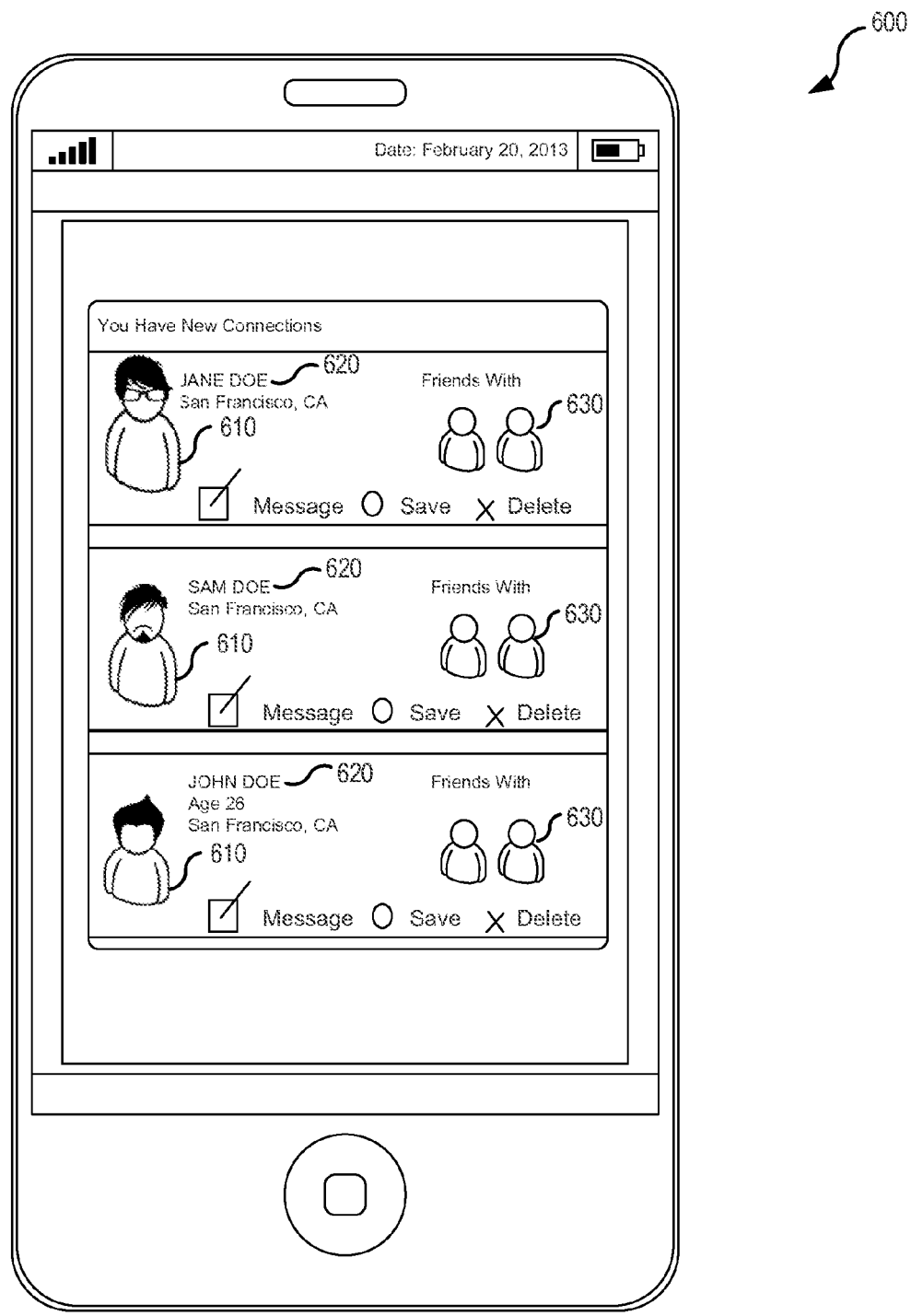
FIG. 6 is a graphical user interface screen which may be used in various embodiments of the present invention.

A preference set or set of criteria may be used to rank the candidate users and/or select only a subset of the candidate users 230. For example, user 210 may be looking to meet new single people and the preference set may indicate that a relationship status of single or unknown be required for any of the friends of friends of user 210 to be returned as candidate users. The preference set can also include other filters such as, but not limited to, interested in men, interested in women, geographic limitations, age ranges, and the like. In some embodiments, the candidate users may be further restricted based on participation preferences and/or privacy policies set within social networking system 135. The candidate users and/or the connector members 220 may be presented through a graphical user interface screen (e.g., as illustrated in FIG. 6).

Figure 3:
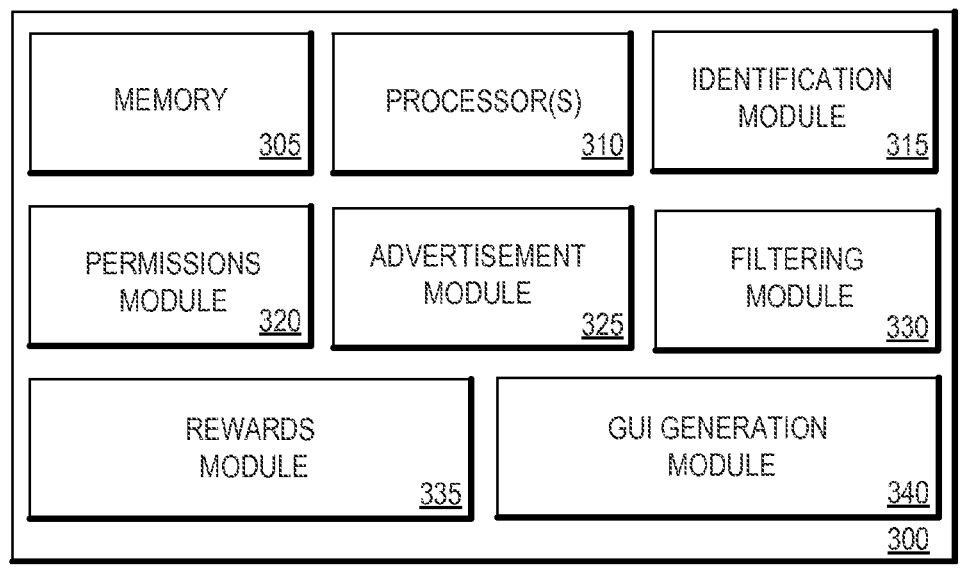
FIG. 3 shows a block diagram with components of a connection system that may be used with one or more embodiments of the present invention.

FIG. 3 shows a block diagram with components of a connection system 300 that may be used with one or more embodiments of the present invention. According to the embodiments shown in FIG. 3, the system can include memory 305, one or more processors 310, identification module 315, permission module 320, advertisement module 325, filtering module 330, rewards module 335, and graphical user interface (GUI) generation module 340. Other embodiments of the present invention may include some, all, or none of these modules and components along with other modules, applications, and/or components. Still yet, some embodiments may incorporate two or more of these modules into a single module and/or associate a portion of the functionality of one or more of these modules with a different module. For example, in one embodiment, identification module 315 and permission module 320 can be combined into a single module for identifying candidate users.

Memory 305 can be any device, mechanism, or populated data structure used for storing information. In accordance with some embodiments of the present invention, memory 305 can encompass any type of, but is not limited to, volatile memory, nonvolatile memory, and dynamic memory. For example, memory 305 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 305 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 305.

Memory 305 may be used to store instructions for running one or more applications or modules on processor(s) 310. For example, memory 305 could be used in one or more embodiments to house all or some of the instructions needed to execute the functionality of identification module 315, permission module 320, advertisement module 325, filtering module 330, rewards module 335, and/or GUI generation module 340.

Identification module 315 can generate a set of candidate users that match preferences supplied by a request from a connection application. The request may identify the user submitting the request and may include a preference set. In some cases, the preference set may be associated with the application itself or include elements designated by the application. For example, a dating application may have a preference set that requests only members of the social network that have a relationship status of single or unknown be returned. In other cases, the user may specify additional filter criteria such as age, location, life experience (e.g., has twins), interests, medical experiences, etc. Identification module 315 can generate the set of candidate users based on the preference set and the members, objects, and connections within the social network and/or the third-party service. In some embodiments, identification module 315 may only generate the set of candidate users from friends of friends of the user submitting the request.

Permission module 320 can be communicably coupled to identification module 315 and configured to identify permissions set by each member, the application, the third-party service, and/or the social network. The permissions may include restrictions regarding information about the set of candidate users that can be transmitted, shared, and/or used to identify candidate users. In some cases, only candidate users that are members of the third-party service and/or have opted in for participation may be included in the candidate users. As another example, if the requesting user is over eighteen years of age, permissions module 320 may filter out anyone that is younger than eighteen years of age. Filtering module 330 can reduce the set of candidate users based on one or more filter criteria such as, but not limited to, location, relationship status, medical experience, or life experience.

Advertisement module 325 can generate advertisements requesting the members of the social network allow the social network to share member information with the third-party applications. In exchange for participation, one or more rewards may be granted by rewards module 335. For example, if the third-party application is associated with a mobile phone manufacturer, then users may be able to search of candidate users that have (or have had) a particular mobile phone. The users may be seeking these candidate users for discussions regarding the mobile phone. In exchange for participation, rewards module 335 may offer discounts on new phones from the manufacturer or early access to new devices.

GUI generation module 340 can generate one or more graphical user interface screens. These screens can be used to display information (e.g., regarding the candidate users and/or connector users). In some embodiments, the graphical user interface screens can be used to assign filter criteria to the preference set, selecting rewards, messaging candidate users, messaging connector users, messaging other members of the social networking system, and/or other activities.

Figure 4:
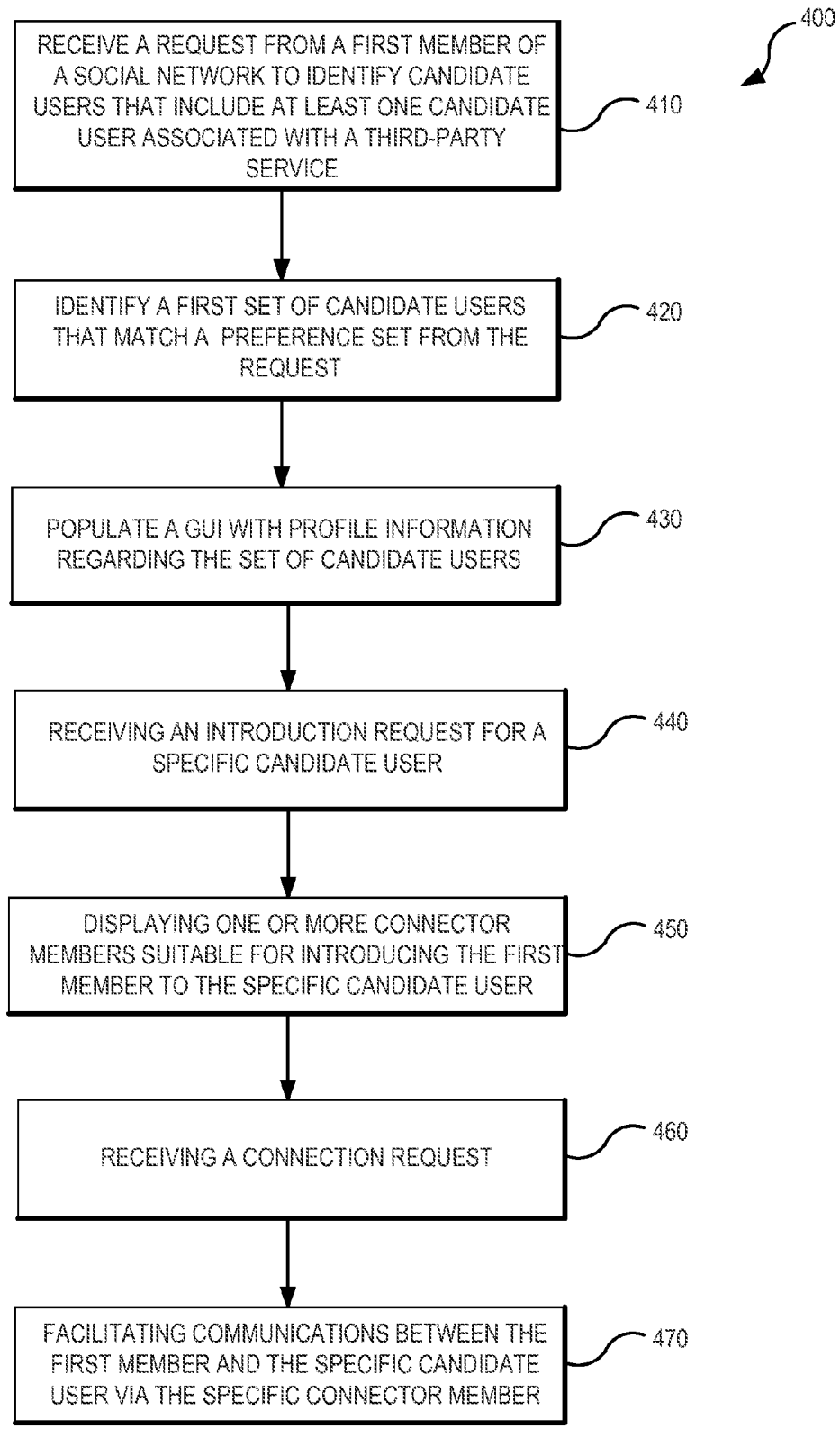
FIG. 4 is a flowchart with a set of operations for identifying and connecting candidate users to members in accordance with various embodiments of the present invention.

FIG. 4 is a flowchart with a set of operations 400 for identifying and connecting candidate users to members in accordance with various embodiments of the present invention. As illustrated in FIG. 4, receiving operation 410 receives a request from a first member to identify candidate users. Identification operation 420 identifies the set of candidate users. In some embodiments, the candidate users may only be identified as such if they match a preference set associated with the request and are members of the social network, members of the third-party service, or members of both the social network and the third-party service.

Once the candidate users have been identified, population operation 430 can populate a GUI with profile information regarding one or more of the candidate users. Using the GUI, the first member can review the profile information and determine if an introduction would be desirable. During introduction operation 440, the GUI can receive an introduction request from the first member that identifies a specific candidate. In response, one or more connector members can be displayed on the GUI during connector operation 450. In other embodiments, connector operation 450 may display the connector members within the GUI along with the profile information during population operation 430.

The first member can review the connector members and determine a specific connector member to facilitate the connection or to simply find out more information about the specific candidate user. Once the first member has identified a specific connector member, the user can submit a connection request which is received at the GUI during connection request receiving operation 460. Communication operation 470 can then facilitate communications (e.g., through a private chat) between the first member and the specific candidate user via the specific connector member.

Figure 5:
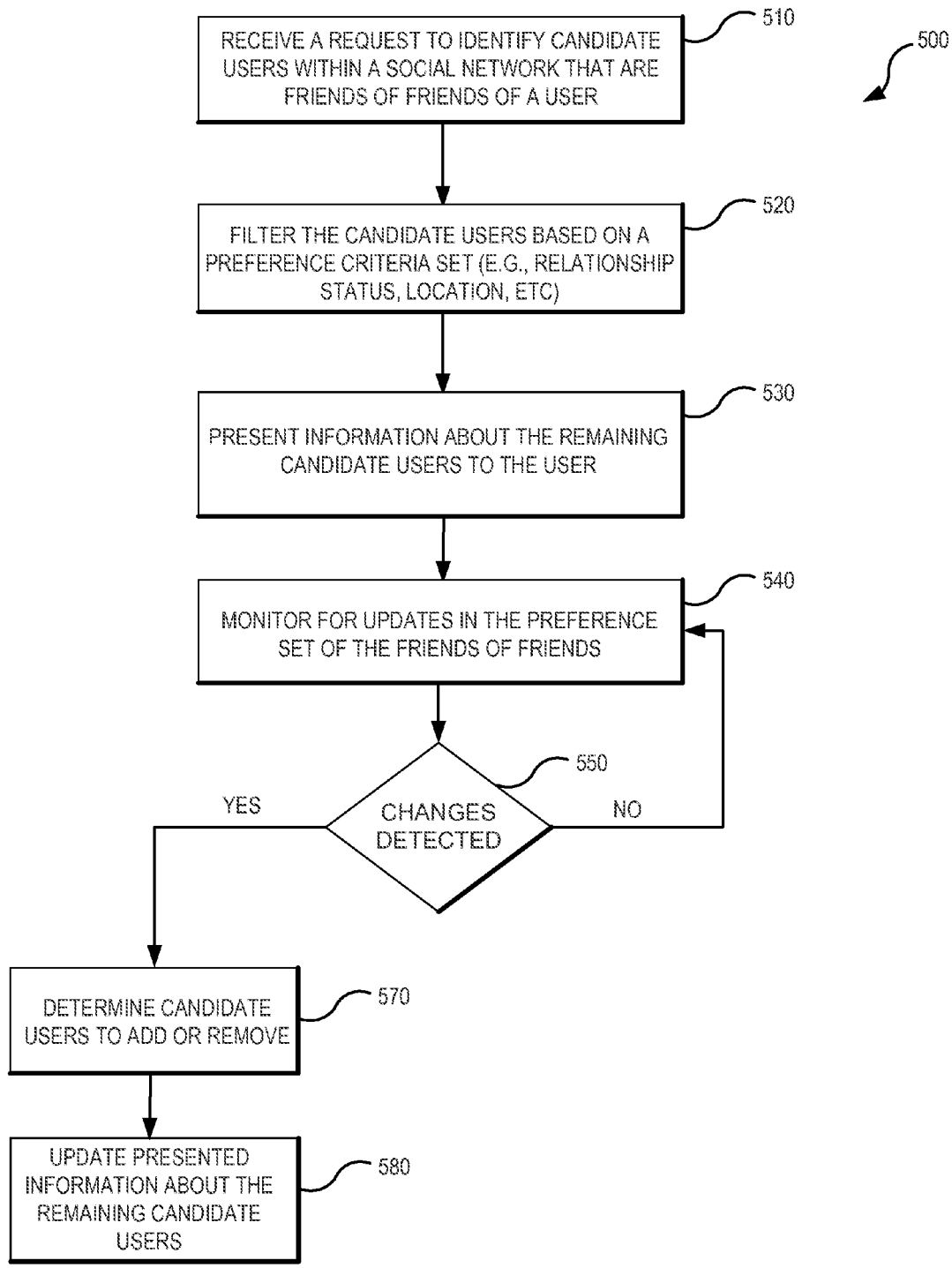
FIG. 5 is a flowchart with a set of operations for presenting information to a user regarding candidate users in accordance with some embodiments of the present invention.

FIG. 5 is a flowchart with a set of operations 500 for presenting information to a user regarding candidate users in accordance with some embodiments of the present invention. As illustrated in FIG. 5, receiving operation 510 receives a request to identify candidate users within a social network that are friends of friends of a user. Filtering operation 520 can filter the candidate users based on a set of preference criteria. The preference criteria set may include restrictions on the candidate users such as relationship status, location, particular experiences, and the like. For example, someone about to have triplets may request that only candidate users that can be identified as having had triplets be returned.

Presentation operation 530 presents the information about the remaining candidate users to the user. However, since compliance with the preference criteria set can change, monitoring operation 540 monitors the set of potential candidate users (e.g., the friends of friends) for updates. If no change is detected, detection operation 550 branches back to monitoring operation 540. If a change is detected, the detection operation 550 branches to determination operation 570 where a determination to add or remove candidate users is made. Then updated information about the remaining candidate users is presented during update operation 580.

FIG. 6 is a graphical user interface screen 600 which may be used in various embodiments of the present invention. GUI 600 illustrates how information might be presented to the user regarding the candidate. The information may include the profile picture 610 and name 620, in addition to anything else set as public information (e.g., location, age, interests, etc.). Some embodiments allow for new candidate users to appear when the user connects with new users within the social networking system, when friends of friends change information (e.g., relationship status), or when friends of friends have selected the user. When the user is interested in a candidate user, they may send a message to the connector members 630 (e.g., common friends) that are identified to find out more information or to make introductions. In other cases, the system may allow the user to contact the candidate user directly indicating the common friends or topic.

Social Networking System Architecture

As mentioned above, embodiments of the present invention can be utilized within a social networking system. Typically, a social networking system includes one or more computing devices storing user profiles associated with users and/or other objects as well as connections between users and other users and/or objects. In use, users join the social networking system and then add connections to other users or objects of the social networking system to which they desire to be connected. The users may be individuals or entities such as businesses, organizations, universities, or manufacturers. The social networking system allows its users to interact with each other as well as with other objects maintained by the social networking system. In some embodiments, the social networking system allows users to interact with third-party websites and financial account providers.

Based on stored data about users, objects, and connections between users and/or objects, the social networking system can generate and maintain a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system can modify edges connecting the various nodes to reflect the interactions.

Figure 7:
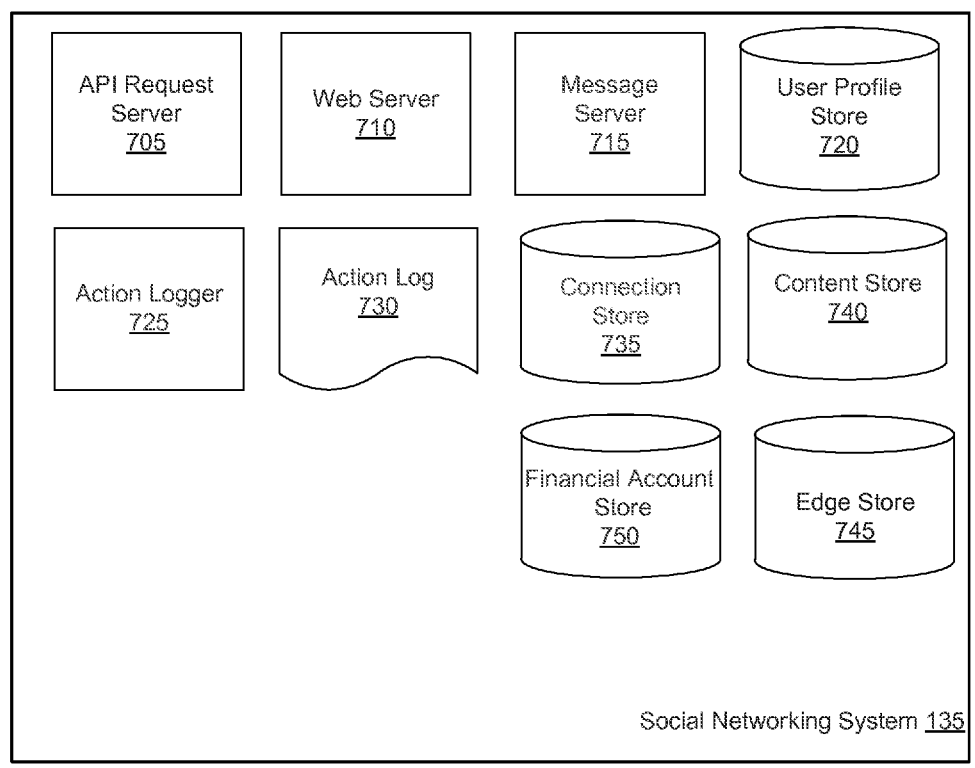
FIG. 7 is a block diagram of a system architecture of the social networking system with which some embodiments of the present invention may be utilized.

FIG. 7 is a block diagram of a system architecture of the social networking system 135 with which some embodiments of the present invention may be utilized. Social networking system 135 illustrated by FIG. 7 includes API request server 705, web server 710, message server 715, user profile store 720, action logger 725, action log 730, connection store 735, content store 740, edge store 745, and financial account store 750. In other embodiments, social networking system 135 may include additional, fewer, or different modules for various applications. Conventional components such as network interfaces, security mechanisms, load balancers, failover servers, management and network operations consoles, and the like are not shown so as to not obscure the details of the system architecture.

API request server 705 allows other systems, user devices, or tools to access information from social networking system 135 by calling APIs. The information provided by the social network may include user profile information or the connection information of users as determined by their individual privacy settings. For example, a system, user device, or tools interested in accessing data connections within a social networking system may send an API request to social networking system 135 via a network. The API request is received at social networking system 135 by API request server 705. API request server 705 processes the request by submitting the access request to an access management system where access is determined and any data communicated back to the requesting system, user device, or tools via a network.

Web server 710 links social networking system 135 via a network to one or more client devices; the web server serves web pages, as well as other web-related content, such as Java, Flash, XML, and so forth. The web server 710 may communicate with the message server 715 that provides the functionality of receiving and routing messages between social networking system 135 and client devices. The messages processed by message server 715 can be instant messages, queued messages (e.g., email), text and SMS (short message service) messages, or any other suitable messaging technique. In some embodiments, a message sent by a user to another can be viewed by other users of social networking system 135, for example, by the connections of the user receiving the message. An example of a type of message that can be viewed by other users of the social networking system besides the recipient of the message is a wall post. In some embodiments, a user can send a private message to another user that can only be retrieved by the other user.

Each user of the social networking system 135 is associated with a user profile, which is stored in user profile store 720. A user profile includes declarative information about the user that was explicitly shared by the user, and may also include profile information inferred by social networking system 135. In one embodiment, a user profile includes multiple data fields, each data field describing one or more attributes of the corresponding user of social networking system 135. The user profile information stored in user profile store 720 describes the users of social networking system 135, including biographic, demographic, and other types of descriptive information, such as work experience, educational history, gender, hobbies, preferences, location, and the like. A user profile may also store other information provided by the user, for example, images or videos. In certain embodiments, images of users may be tagged with identification information of users of social networking system 135 displayed in an image. A user profile in user profile store 720 may also maintain references to actions by the corresponding user performed on content items in content store 740 and stored in the edge store 745.

A user profile may be associated with one or more financial accounts, allowing the user profile to include data retrieved from or derived from a financial account. A user may specify one or more privacy settings, which are stored in the user profile, that limit information from a financial account that social networking system 135 is permitted to access. For example, a privacy setting limits social networking system 135 to accessing the transaction history of the financial account and not the current account balance. As another example, a privacy setting limits social networking system 135 to a subset of the transaction history of the financial account, allowing social networking system 135 to access transactions within a specified time range, transactions involving less than a threshold transaction amount, transactions associated with specified vendor identifiers, transactions associated with vendor identifiers other than specified vendor identifiers or any suitable criteria limiting information from a financial account identified by a user that is accessible by social networking system 135. In one embodiment, information from the financial account is stored in user profile store 720. In other embodiments, it may be stored in financial account store 750.

Action logger 725 receives communications about user actions on and/or off social networking system 135, populating action log 730 with information about user actions. Such actions may include, for example, adding a connection to another user, sending a message to another user, uploading an image, reading a message from another user, viewing content associated with another user, attending an event posted by another user, among others. In some embodiments, action logger 725 receives, subject to one or more privacy settings, transaction information from a financial account associated with a user and identifies user actions from the transaction information. For example, action logger 725 retrieves vendor identifiers from the financial account's transaction history and identifies an object, such as a page, in social networking system 135 associated with the vendor identifier. This allows action logger 725 to identify a user's purchases of products or services that are associated with a page, or another object, in content store 740. In addition, a number of actions described in connection with other objects are directed at particular users, so these actions are associated with those users as well. These actions are stored in action log 730.

Action log 730 may be used by social networking system 135 to track user actions on social networking system 135, as well as external websites that communicate information to social networking system 135. Users may interact with various objects on social networking system 135, including commenting on posts, sharing links, and checking-in to physical locations via a mobile device, accessing content items in a sequence or other interactions Information describing these actions is stored in action log 730. Additional examples of interactions with objects on social networking system 135 included in action log 730 include commenting on a photo album, communications between users, becoming a fan of a musician, adding an event to a calendar, joining a group, becoming a fan of a brand page, creating an event, authorizing an application, using an application and engaging in a transaction. Additionally, action log 730 records a user's interactions with advertisements on social networking system 135 as well as other applications operating on social networking system 135. In some embodiments, data from action log 730 is used to infer interests or preferences of the user, augmenting the interests included in the user profile and allowing a more complete understanding of user preferences.

Action log 730 may also store user actions taken on external websites and/or determined from a financial account associated with the user. For example, an e-commerce website that primarily sells sporting equipment at bargain prices may recognize a user of social networking system 135 through social plug-ins that enable the e-commerce website to identify the user of social networking system 135. Because users of social networking system 135 are uniquely identifiable, e-commerce websites, such as this sporting equipment retailer, may use the information about these users as they visit their websites. Action log 730 records data about these users, including webpage viewing histories, advertisements that were engaged, purchases made, and other patterns from shopping and buying. Actions identified by action logger 725 from the transaction history of a financial account associated with the user allow action log 730 to record further information about additional types of user actions.

In some embodiments, social networking system 135 further stores data describing one or more connections between different users in the connection store 735. The data describing one or more connections can include a list of connections, a date each connection (i.e., friendship) was made, etc. The connections may be further defined by users, allowing users to specify their relationships with other users. For example, the connections allow users to generate relationships with other users that parallel the users' real-life relationships, such as friends, co-workers, partners, and so forth. In one embodiment, the connection specifies a connection type based on the type of relationship. Examples of the type of relationship include family, friend, colleague, etc. Users may select from predefined types of connections, or define their own connection types as needed. Some or all of this information may also be stored as edge objects in edge store 745.

Content store 740 stores content items associated with a user profile, such as images, videos or audio files. Content items from content store 740 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of social networking system 135. Examples of social networking content items include suggested connections or suggestions to perform other actions, media provided to, or maintained by, social networking system 135 (e.g., pictures or videos), status messages or links posted by users to the social networking system, events, groups, pages (e.g., representing an organization or commercial entity), and any other content provided by, or accessible via, the social networking system.

Content store 740 also includes one or more pages associated with entities having user profiles in user profile store 720. An entity is a non-individual user of social networking system 135, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in content store 740, allowing social networking system users to more easily interact with the vendor via social networking system 135. A vendor identifier is associated with a vendor's page, allowing social networking system 135 to identify the vendor and/or to retrieve additional information about the vendor from user profile store 720, action log 730 or from any other suitable source using the vendor identifier. In some embodiments, the content store 740 may also store one or more targeting criteria associated with stored objects and identifying one or more characteristics of a user to which the object is eligible to be presented.

In one embodiment, edge store 745 stores the information describing connections between users and other objects on social networking system 135 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in social networking system 135, such as expressing interest in a page on the social networking system, sharing a link with other users of the social networking system, and commenting on posts made by other users of the social networking system. Edge store 745 stores edge objects that include information about the edge, such as affinity scores for objects, interests, and other users. Affinity scores may be computed by social networking system 135 over time to approximate a user's affinity for an object, interest, and other users in social networking system 135 based on the actions performed by the user. Multiple interactions between a user and a specific object may be stored in one edge object in edge store 745, in one embodiment. In some embodiments, connections between users may be stored in user profile store 720, or user profile store 720 may access edge store 745 to determine connections between users.

Exemplary Computer System Overview

Figure 8:
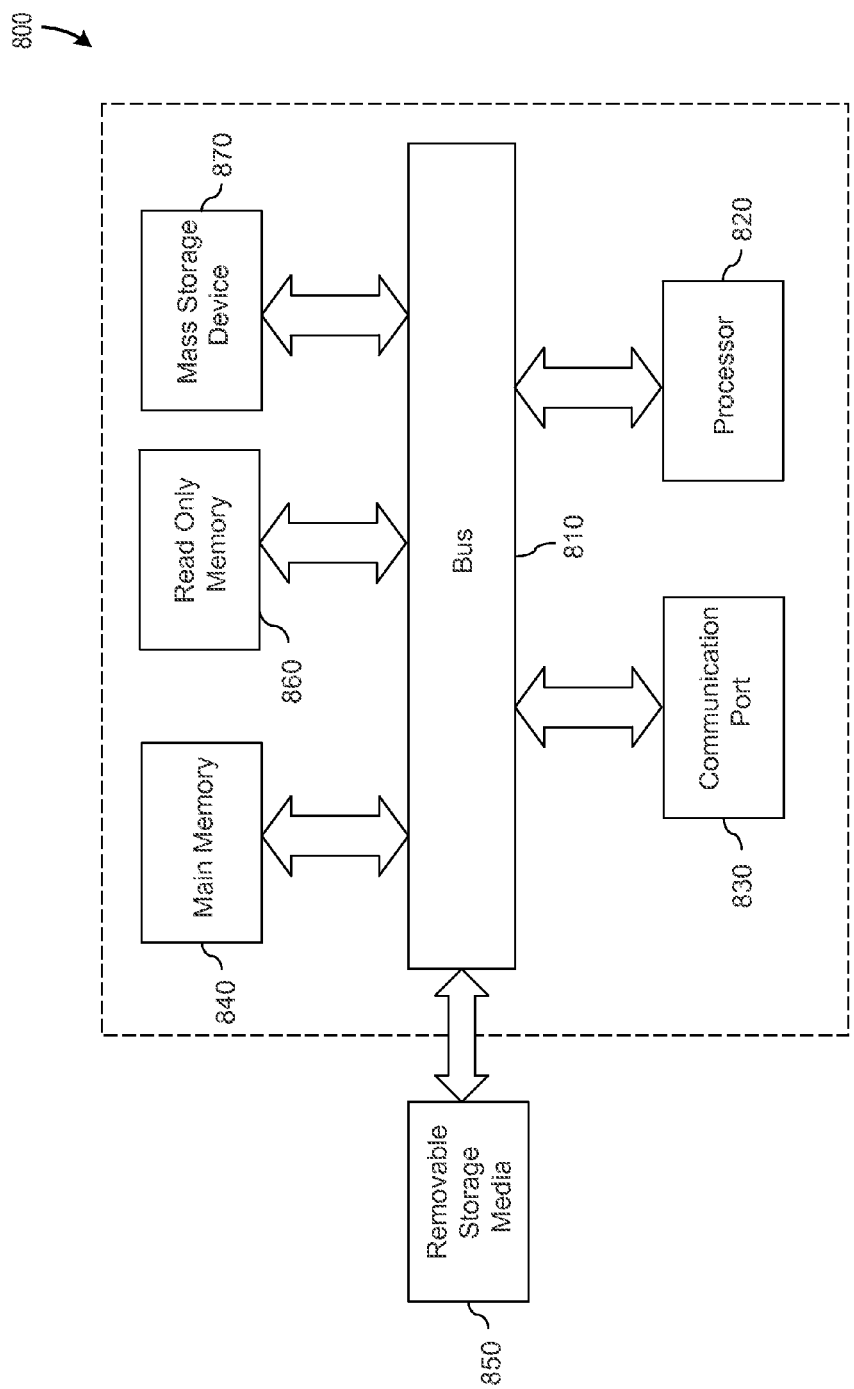
FIG. 8 illustrates an example of a computer system with which some embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is an example of a computer system 800 with which embodiments of the present invention may be utilized. According to the present example, the computer system includes a bus 810, at least one processor 820, at least one communication port 830, a main memory 840, a removable storage media 850, a read only memory 860, and a mass storage 870.

Processor(s) 820 can be any known processor, such as, but not limited to, ARM or x86-type processors, such as an Intel® Itanium® or Itanium 2® processor(s); AMD® Opteron® or Athlon MP® processor(s); or Motorola® lines of processors. Communication port(s) 830 can be any of an RS-232 port for use with a modem-based dialup connection, a 10/100 Ethernet port, or a Gigabit port using copper or fiber. Communication port(s) 830 may be chosen depending on a network such as a Local Area Network (LAN), Wide Area Network (WAN), or any network to which the computer system 800 connects. The communication port 830 may also encompass wireless communications components, such as an IEEE 802.11, 3G/4G or other wireless transceiver.

Main memory 840 can be Random Access Memory (RAM) or any other dynamic storage device(s) commonly known in the art. Read only memory 860 can be any static storage device(s) such as Programmable Read Only Memory (PROM) chips for storing static information such as instructions for processor 820.

Mass storage 870 can be used to store information and instructions. For example, hard disks such as the Adaptec® family of SCSI drives, an optical disc, an array of disks such as RAID, such as the Adaptec family of RAID drives, or any other mass storage devices may be used.

Bus 810 communicatively couples processor(s) 820 with the other memory, storage and communication blocks. Bus 810 can be a PCI/PCI-X or SCSI based system bus depending on the storage devices used.

Removable storage media 850 can be any kind of external hard-drives, floppy drives, 10MEGA® Zip Drives, Compact Disc-Read Only Memory (CD-ROM), Compact Disc-Re-Writable (CD-RW), and/or Digital Video Disk-Read Only Memory (DVD-ROM).

The components described above are meant to exemplify some types of possibilities. In no way should the aforementioned examples limit the scope of the invention, as they are only exemplary embodiments.

In conclusion, the present invention provides novel systems, methods and arrangements for connecting users of a social networking system. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations that fall within the scope of the claims, together with all equivalents thereof. Therefore, the above description should not be taken as limiting the scope of the invention, which is defined by the appended claims.

What is claimed is:

1. A method comprising:
maintaining a social graph for members of a social network, the social graph including different types of connections between members of the social network, each type of connection based on an action performed by each member of the social network, wherein at least some of the different types of connections include a friendship connection;
receiving a request from a first member of the social network to identify individual candidate users, from the members of the social network, for introduction to the first member, wherein the request includes a request to identify, for the individual candidate users, at least one candidate user associated with a third-party service, wherein the third-party service is a dating service;
identifying, using the social graph from the social network, a set of candidate users that match a preference set and include the at least one candidate user associated with the third-party service, said identifying including ranking the set of candidate users based on the preference set and selecting a subset of the set of candidate users for the first member;
populating a graphical user interface with profile information about the subset of the set of candidate users selected for the first member;
receiving, from the first member via the graphical user interface, an introduction request for one or more connector members from the social network to introduce the first member to a specific candidate user of the subset of the set of candidate users, the one or more connector members being a common friend of the first member and the specific candidate user;
identifying and displaying, within the graphical user interface, the one or more connector members associated with the specific candidate user, thereby being suitable for introducing the first member to the specific candidate user, wherein the one or more connector members are identified using the social graph from the social network;
receiving, from the first member, a connection request within the graphical user interface, the connection request requesting a specific connector member, from the one or more connector members, to connect the first member to the specific candidate user;
facilitating communications between the first member and the specific candidate via the specific connector member; and
monitoring the preference set of the set of candidate users and notifying the first member of any changes to the set of candidate users, wherein users in the set of candidate users are not connections of the first member.

2. The method of claim 1, wherein the preference set includes a relationship status of single or unknown.

3. The method of claim 1, wherein the each candidate user in the set of candidate users has a first profile with the social network and a second profile with the third party service.

4. The method of claim 3, wherein the profile information regarding the subset of candidate users is collected from the first profile and the second profile.

5. The method of claim 1, wherein the profile information includes only public information from the first profile.

6. The method of claim 1, wherein the specific connector member is a common friend of the first member and specific candidate user.

7. The method of claim 1, further comprising:
displaying advertisements within the social network requesting members participate with the third-party service; and providing rewards to any member that participates with the third-party service.

8. A computer-implemented system, comprising: a processor;
a database having stored thereon a plurality of data about members, objects, and connections within a social network and a social graph based on the plurality of data about members, objects, and connections, the social graph including different types of connections between members of the social network, each type of connection being based on an action performed by each member of the social network;
an application programming interface (API) server configured to receive information that identifies a subset of the individual members that are associated with a third-party service and the social network, wherein the information also includes a third-party profile for each member in the subset of members;
an identification module configured to generate a set of candidate users for a first member of the social network, wherein the set of candidate users are selected from the subset of individual members that match a preference set and are associated with the third-party service and the social network, the identification module further configured to rank the set of candidate users based on the preference set and to select a subset of the set of candidate users for the first member; and
a graphical user interface generation module configured to generate a graphical user interface screen with profile information regarding each candidate user in the subset of candidate users, present one or more connector members suitable for introducing the first member to a specific candidate user of the subset of candidate users, and to facilitate communications between the first member and the specific candidate user through the one or more connector members, the one or more connector members being a common friend of the first member and the specific candidate user, wherein the identification module is further configured to monitor the preference set of the set of candidate users and notify the first member of any changes to the set of candidate users, wherein users in the set of candidate users are not connections of the first member.

9. The computer-implemented system of claim 8, further comprising an advertisement module configured to generate advertisements requesting the members of the social network participate with the third-party service.

10. The computer-implemented system of claim 8, further comprising a permissions module communicably coupled to the identification module and configured to identify permissions set by each candidate user in the subset of candidate users regarding profile information that can be shared.

11. The computer-implemented system of claim 8, further comprising a filtering module configured to reduce the set of candidate users based on one or more filter criteria.

12. The computer-implemented system of claim 11, wherein the filter criteria includes a location, relationship status, medical experience, or life experience.

13. The computer-implemented system of claim 8, further comprising a rewards module configured to determine one or more rewards based on participation of the first member with the third-party service.

14. The computer-implemented system of claim 8, wherein the third-party service is a dating service.

15. A computer-implemented method, comprising:
maintaining a social graph for individual members of a social network, the social graph including different types of connections between members of the social network, each type of connection being based on an action performed by each member of the social network, wherein the different types of connections include a friendship connection;
generating a database of profile information regarding a subset of members of the individual members of the social network that are also participating with a third-party service, wherein the profile information includes data from a social network profile and a third-party service profile;
receiving a request from a first member, of the subset of members, to identify a set of candidate users that include the subset of members of the social network and the third-party service, wherein the first member has agreed to participate with the third-party service;
generating a graphical user interface screen that allows the first member specify a preference set;
identifying, upon receiving the preference set, the set of candidate users to be presented to the first member through the graphical user interface, wherein identifying the set of candidate users uses the profile information stored in the database and the social graph of the social network, said identifying including ranking the set of candidate users based on the preference set and selecting a subset of the set of candidate users for the first member;
identifying and presenting, in the graphical user interface screen, one or more connector members for one or more candidate users along with a subset of the profile information, wherein the one or more connector members are identified using the social graph from the social network, the one or more connector members being a common friend of the first member and a candidate user in the set of candidate users; and
facilitating, through the graphical user interface screen, communication between the first member and the candidate user through the one or more connector members; and
monitoring the preference set of the set of candidate users and notifying the first member of any changes to the set of candidate users, wherein users in the set of candidate users are not connections of the first member.

16. The computer-implemented method of claim 15, wherein the profile information includes public information from the social network profile.

17. The computer-implemented method of claim 15, further comprising:
displaying advertisements within the social network requesting members participate with the third-party service; and
providing rewards to any member that participates with the third-party service.

18. The computer-implemented method of claim 15, further comprising updating the set of candidate users based on changes to profile information associated with each of the candidate users.

19. The computer-implemented method of claim 15, wherein the preference set includes a relationship status of single.

* * * * *